United States Patent Office 3,305,371
Patented Feb. 21, 1967

3,305,371
GLASS COMPOSITIONS
Stéphane Dufaure de Lajarte, Paris, France, assignor to Compagnie de Saint-Gobain, Neuilly-sur-Seine, France
No Drawing. Filed Apr. 17, 1962, Ser. No. 188,257
Claims priority, application France, May 29, 1956, 715,431
4 Claims. (Cl. 106—52)

This is a continuation-in-part of application Ser. No. 661,005 filed May 23, 1957, and now abandoned.

This invention relates to glass manufacture and to silico-aluminous glasses containing no appreciable quantities of alkali metal oxides ($Na_2O$, $K_2O$, $Li_2O$) or of boric anhydride ($B_2O_3$).

Glasses of silico-aluminous type are known to possess high viscosity at high temperature and it is very difficult in making them to vitrify all the silica, the excess of which tends to separate out and to gather on the surface of the melted glass. Therefore, up to the present the manufacture of such glasses has not been accomplished except slowly and at very high temperature with the risk of incomplete fusion.

It is an object of this invention to make silico-aluminous glasses which do not have this imperfection and which may be easily vitrified under conditions analogous to those used in making silica-alkali-lime glasses, that is to say, at a temperature not over 1500° C., and which may be worked as by forming into articles under analogous conditions.

Another object of the invention is to prepare silico-aluminous glasses which have high chemical resistance.

Yet another object is to prepare the novel glasses in such manner as to eliminate a tendency to crystallization.

Another object of the invention is to make glass which is substantially insensible to nuclear radiation and which, when exposed to such radiation, does not itself become radioactive.

Another object of the invention is to make a glass adapted for use in nuclear undertakings which is not clouded by prolonged exposure to nuclear radiation. Another object is to make windows for the inspection of nuclear processes and containers for substances to be radio-activated.

The objects of the invention are accomplished, generally speaking, by glasses of the following composition by weight percentages:

| | Percent |
|---|---|
| Silica | 40–50 |
| Alumina | 10–25 |
| At least one of lime, magnesia, barita (CaO, MgO, BaO) | [1] 15–35 |

[1] Preferably 25–35.

And, when desired, as vitrifying agents:

| | Percent |
|---|---|
| Titanium oxide ($TiO_2$) | 0–15 |
| Iron oxide ($Fe_2O_3$) | 0–15 |
| +Fluorine (F) | 0–5 |

The total of $SiO_2$, $Al_2O_3$, $TiO_2$ (if present) and $Fe_2O_3$ (if present) should not exceed 80%. It is important to respect the limits of composition indicated.

The new glasses have excellent chemical durability. For example, if the quantity of silica falls below 40%, chemical durability is much reduced and the glasses have a strong tendency to crystallization.

Contrary to the usual glasses, they do not contain the oxides $Na_2O$ and $K_2O$ which form highly radioactive isotopes under the action of neutron radiation, nor do they contain lithium oxide ($Li_2O$) and boron oxide ($B_2O_3$) which offer a large capturing surface for neutrons. The percentage of alkaline metal oxides in the glasses of the invention is generally not over 0.1% and their content of $B_2O_3$ is lower or at most 0.1%.

It is contrary to what one would expect that the presence of material proportions of the oxides of calcium, magnesium and barium should reduce the tendency of such glasses to devitrify. From this point of view, it is preferable that the content of lime should not exceed 20% of the total weight of the glass and it is also desirable to have oxides of all three of Ca, Mg, and Ba present, each one in a proportion of at least several percent of the total weight of the glass. In order to reduce the temperature of the liquidus (upper limit of devitrification) and the devitrification speed it is advantageous to have a content of BaO of at least 5% and, in particular, from 5 to 10%. Preferably the total content of BaO, MgO and CaO is above 25% up to 35%.

The percentages expressed herein are percentages by weight based on the total weight of the glass unless otherwise specified. For example, in the case of F, the F is added to 100% of the other ingredients.

The presence of titanium oxide lowers the temperature of vitrification and makes it easier. Iron oxide acts similarly but produces glasses which are opaque to visible and to infra-red rays if it be present in a quantity greater than several percent, but as glass may frequently be without need of transparency, iron oxide is as frequently useful in addition to or as a substitute for titanium oxide. Fluorine favors vitrification, lowers the temperature of vitrification, and reduces the tendency to devitrification. It is not necessary to exceed 5% because the loss by volatilization then becomes important.

EXAMPLES 1 TO 5

| | 1 | 2 | 3 | 4 | 5 |
|---|---|---|---|---|---|
| $SiO_2$ | 48 | 46 | 46 | 44 | 45 |
| $TiO_2$ | 5 | 5 | 10 | | 5 |
| $Al_2O_3$ | 22 | 20 | 15 | 20 | 20 |
| $Fe_2O_3$ | | | | 10 | 5 |
| MgO | 6 | 8 | 8 | 8 | 5 |
| CaO | 14 | 16 | 16 | 13 | 11 |
| BaO | 5 | 5 | 5 | 5 | 9 |
| +F | 4 | 4 | 4 | 4 | 4 |

The foregoing glasses were obtained by melting the raw materials indicated in the following table at the temperatures indicated:

| | 1 | 2 | 3 | 4 | 5 |
|---|---|---|---|---|---|
| Crushed Sand | 48 | 46 | 46 | 44 | 45 |
| Hydrated Alumina | 33.7 | 30.6 | 23 | 30.6 | 30.6 |
| Titanium Oxide | 5 | 5 | 10 | 0 | 5.0 |
| Fluorspar | 8.2 | 8.2 | 8.2 | 8.2 | 8.2 |
| Dolomite | 26.3 | 32.8 | 32.8 | 24.0 | 17.6 |
| Magnesium Carbonate | 1.1 | 2.1 | 2.1 | 5.8 | 2.8 |
| Barium Carbonate | 6.4 | 6.4 | 6.4 | 6.4 | 11.5 |
| Iron Oxide | | | | 10.0 | 5.0 |
| Manufacturing Temperature in ° C | 1,470 | 1,480 | 1,470 | 1,470 | 1,470 |

The characteristics of the glasses in the first table were as follows:

| | 1 | 2 | 3 | 4 | 5 |
|---|---|---|---|---|---|
| Density | 2.78 | 2.79 | 2.87 | 3.10 | 3.02 |
| Chemical attackability (method DGG), mg | 4 | 4 | 3 | 4 | 3 |
| Logarithm of Viscosity at 1,200° C | 2.98 | 2.70 | 2.33 | 2.65 | 2.54 |
| Logarithm of Viscosity at 1,300° C | 2.25 | 2.10 | 2.00 | 2.20 | 2.05 |

The chemical attackability is determined by the standard method of the Deutsche Glastechnische Gesselschaft (method DGG). According to that method 4 cc. of glass powder passing between screens 45 and 50 are heated for 5 hours at 102° C. in the presence of water, of which the volume is kept constant at 100 cc. The aqueous solution is filtered off and evaporated to dryness, and the residue of the evaporation is dried at 150° C. and weighed. The residue is expressed in milligrams per 100 cc. of water.

By way of comparison, the residue of bottle glass is on the order of 25 mg., and that of window glass on the order of 30 to 40 mg.

An important property of the glasses employing the invention is their insensibility to nuclear radiation. Contrary to usual practice, they do not contain oxides which form radioactive isotopes under neutron bombardment or elements which offer an important section for the capture of neutrons. It results that the glasses conforming to the invention may be applied in atomic industires in all cases where it is necessary to use glass in which radioactive isotopes of sustantial activity and length of life are not generated by irradiation by neutrons, and in which there are no elements offering substantial areas of capture of neutrons.

These glasses are particularly adapted to the manufacture of containers for substances which are to be activated by neutrons within neuclear reactors. Such receptacles, of which the opening must permit the action of radiation on the substances to be activated, must be made of transparent material wherever it is desired to observe the substances irradiated, either during irradiation or afterward, as this makes it unnecessary to remove the substances from the containers. It is indispensable that such containers should not be altered by the substance that is introduced nor by the nuclear radiation, and that it should not interfere with the operation of the reactor by the presence of elements offering a substantial section of capture of neutrons.

Glasses made by this invention are perfectly adapted to this usage. When the container and its content have been removed from the nuclear reactor, the container does not emit any radiation. The thickness of the walls of the container may be established with the object of absorbing part of the radiation and of transforming hard gamma rays emitted by the contained substance into softer and less dangerous gamma rays, without becoming radioactive and without capturing neutrons. The use of the novel containers made from the glasses of this invention materially improves the manipulation and the observation of irradiated substances.

It is possible to put into these new glasses, in the proportions in which they have been used in other glasses, ingredients such as cerium oxide which prevent clouding under the effect of prolonged bombardment by neutrons, thus aiding the containers to maintain their transparency.

The glasses of this invention produce superior windows for the observation of nuclear phenomena. They have high density, which varies generally between 2.6 and 3.0 and may be increased by increasing the content of BaO, and they accomplish the absorption of radiation with lesser thicknesses of glass than ordinary glasses. The absence in the new glasses of radioactivable elements permits one to dismount and to manipulate windows without being exposed to irradiation by radioactive isotopes formed in the glasses.

The advantages of the invention are numerous and have been expounded as the description has proceeded. No effort has been made to explain herein every use to which the new glasses may be put, but all uses are included within the protection of the claims.

The new glasses have many unique and distinctive properties, and the process by which they are made proceeds under ordinary conditions of fusion pertaining to silico aluminous glasses. By varying the content and percentage of the different ingredients within the bounds set, one can modify the properties of the glasses, producing glasses having emphasized or modified properties at will.

The chemical stability of the glasses makes them particularly suitable for use in observations which take place over very long periods of time.

As many apparently widely different embodiments of the present invention may be made without departing from the spirit and scope thereof, it is to be understood that the invention is not limited to the specific embodiments.

What is claimed is:

1. Glass which contains no appreciable quantities of elements which capture neutrons, and which contains at most 0.1% by weight of each of $Na_2O$, $K_2O$, $Li_2O$, and $B_2O_3$, which consists by weight percent essentially of Silica ($SiO_2$) 40–50%, Alumina ($Al_2O_3$) 10–25%, BaO 5–10%, and CaO and MgO, the content of CaO being less than 20%, in such proportions that the total of BaO+CaO+MgO is 25–35%, $TiO_2$ up to 8%, and $SiO_2$+$Al_2O_3$+$TiO_2$ not over 75%.

2. Glass which contains no appreciable quantities of elements which capture neutrons, and which contains at most 0.1% by weight of each of $Na_2O$, $K_2O$, $Li_2O$, and $B_2O_3$, which consists by weight percent essentially of Silica ($SiO_2$) 40–50%, Alumina ($Al_2O_3$) 10–25%, BaO at least 5–10%, and CaO and MgO, the content of CaO being less than 20%, in such proportions that the total of BaO+CaO+MgO is 25–35%, $Fe_2O_3$ up to 15%, and $SiO_2$+$Al_2O_3$+$Fe_2O_3$ not over 75%.

3. Glass which contains no appreciable quantities of elements which capture neutrons, and which contains at most 0.1% by weight of each of $Na_2O$, $K_2O$, $Li_2O$, and $B_2O_3$, which consists by weight percent essentially of Silica ($SiO_2$) 40–50%, Alumina ($Al_2O_3$) 10–25%, BaO at least 5–10%, and the metal oxides CaO and MgO in such proportions that the total of BaO+CaO+MgO is 25–35%, and CaO being less than 20% $Fe_2O_3$ up to 15%, $TiO_2$ up to 15%, and $SiO_2$+$Al_2O_3$+$Fe_2O_3$+$TiO_2$ not over 75%.

4. Glass containing no elements offering substantial areas of capture of neutrons, which does not generate radioactive isotopes during irradiation by neutrons, which consists in its essential ingredients of the following by weight: $SiO_2$ 40–50%, $Al_2O_3$ 10–25%, one or more of the oxides $TiO_2$ and $Fe_2O_3$ but not to exceed 15% of either of them, the total of said $SiO_2$, $Al_2O_3$, $TiO_2$ and $Fe_2O_3$ not exceeding 80%, BaO, 5–10%, CaO and MgO, the content of CaO not exceeding 20% in such proportions that the total of BaO+CaO+MgO is 15–35%, and F in an amount up to about 5% of the total of the other ingredients.

References Cited by the Examiner

UNITED STATES PATENTS

| | | | |
|---|---|---|---|
| 1,529,259 | 3/1925 | Locke et al. | 106—52 |
| 2,710,261 | 6/1955 | McMullen | 106—50 |

FOREIGN PATENTS

| | | |
|---|---|---|
| 101,138 | 6/1937 | Australia. |
| 124,553 | 6/1939 | Australia. |
| 765,244 | 1/1957 | Great Britain. |

HELEN M. McCARTHY, *Acting Primary Examiner.*

JOSEPH REBOLD, TOBIAS E. LEVOW, *Examiners.*

D. J. ARNOLD, *Assistant Examiner.*